US006529583B2

(12) United States Patent
Creamer et al.

(10) Patent No.: US 6,529,583 B2
(45) Date of Patent: Mar. 4, 2003

(54) PSTN CALL SIMULATOR AND METHOD OF OPERATION FOR TESTING PSTN-TO-IP NETWORK TELEPHONE SERVICES FOR INDIVIDUAL AND GROUP INTERNET CLIENTS PRIOR TO AVAILABILITY OF THE SERVICES

(75) Inventors: Thomas E. Creamer, Boca Raton, FL (US); Peeyush Jaiswal, Boca Raton, FL (US); Willie J. Johnson, Plantation, FL (US); Sibyl C. Sullivan, Highland Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/849,394

(22) Filed: May 7, 2001

(65) Prior Publication Data

US 2002/0176543 A1 Nov. 28, 2002

(51) Int. Cl.[7] .......................... H04M 1/24; H04M 3/08; H04M 3/22
(52) U.S. Cl. ...................... 379/10.03; 379/1.01; 379/9; 379/15.03; 370/248
(58) Field of Search .............................. 379/1.01, 1.03, 379/1.04, 9.04, 10.01, 10.02, 10.03, 15.02, 15.03, 29.02, 31; 370/242, 248, 249, 251, 252

(56) References Cited

U.S. PATENT DOCUMENTS

| 3,952,172 | A |   | 4/1976  | Penn et al. ............ 179/175.2 R |
|-----------|---|---|---------|-------------------------------------|
| 4,021,624 | A |   | 5/1977  | Kelly et al. ........... 179/175.2 D |
| 4,238,649 | A |   | 12/1980 | Kemler ................ 179/175.2 D  |
| 5,065,422 | A |   | 11/1991 | Ishikawa .................... 379/11 |
| 5,621,670 | A |   | 4/1997  | Maeda et al. ................ 364/578 |
| 5,835,565 | A | * | 11/1998 | Smith et al. .................... 379/5 |
| 5,933,475 | A | * | 8/1999  | Coleman ........................ 379/1 |
| 6,061,725 | A | * | 5/2000  | Schwaller et al. .......... 709/224 |
| 6,091,802 | A | * | 7/2000  | Smith et al. ................... 379/29 |
| 6,272,208 | B1| * | 8/2001  | Kasrai .......................... 379/15 |
| 6,411,879 | B2| * | 6/2002  | Khasnabish .................... 379/9 |
| 6,421,424 | B1| * | 7/2002  | Creamer et al. ......... 379/15.01 |

OTHER PUBLICATIONS

Ser. No. 09/468,929, entitled "System & Method of Operation for Verifying and Validating Public Switch Telephone Networks (PSTN) to (IP) Network Services", filed Dec. 22, 1999 (BOC9–99–027/1963–7322).
Ser. No. 09/587,322, entitled "A Client Call Simulator and Method of Operation for Testing PSTN–to–IP Network Telephone Services for Individual & Group Internet Clients Prior to Availability of the Services", filed Jun. 5, 2000 (BOC9–1999–0026/1963–7321).

* cited by examiner

Primary Examiner—Binh Tieu
(74) Attorney, Agent, or Firm—Joseph C. Redmond, Jr.; Morgan & Finnegan, LLP (57) ABSTRACT

A telephone call simulator generates telephone calls for large sets of subscribers in a PSTN-IP telephone service for purposes of validating various telephone services, e.g. call waiting, call forwarding, etc. available to subscribers of the telephone service. via the IP network. The telephone numbers of subscribers are grouped in different call processing actions and/or subscriber call behavior based on the options offered by the service. The telephone numbers and test logic scripts are stored in a test input data file. Test logic scripts are generated for each group of related telephone number and stored in a file, typically the test input data file. The test input data file is read by test assignment apparatus which assigns the test logic scripts to process within a call processing pool. The test logic scripts record test result data to a test output data file. Call implementation apparatus in the pool executes random calling of each test logic script for the group of related telephone numbers which records the responses to the test logic scripts in the test output data file validating the telephone services for the related telephone numbers.

30 Claims, 6 Drawing Sheets

PSTN CALL SIMULATOR AND METHOD OF OPERATION FOR TESTING PSTN-TO-IP NETWORK TELEPHONE SERVICES FOR INDIVIDUAL AND GROUP INTERNET CLIENTS PRIOR TO AVAILABILITY OF THE SERVICES

RELATED APPLICATIONS

1) Ser. No. 09/468,929, entitled "System & Method of Operation for Verifying and Validating Public Switch Telephone Networks (PSTN) to (IP) Network Services", filed Dec. 22, 1999 (BOC9-99-027/1963-7322).

2) Ser. No. 09/587,322, entitled "A Client Call Simulator and Method of Operation for Testing PSTN-to-IP Network Telephone Services for Individual & Group Internet Clients Prior to Availability of the Services", filed Jun. 5, 2000 (BOC9-1999-0026/1963-7321) both related applications being assigned to the same assignee as that of the present invention and fully incorporated herein by reference.

BACKGROUND OF THE INVENTION

1. Field of the Invention

This invention relates to call simulators for PSTN-IP network telephone services and methods of operation. More particularly, the invention relates to a PSTN Call simulator and method of operation in testing PSTN to IP network telephone services for individual and group internet clients prior to availability of the telephone services.

2. Description of Prior Art

The introduction of PSTN-IP network based telephone services, e.g., call waiting, call forwarding, call back, etc., requires PSTN or IP network service providers to verify and validate these new services before on-line operations commence. The verification and validity involves generating hundreds of telephone calls per second and simulating thousands of IP network clients as individuals or group internet clients. What is needed to verify or validate a service is a call simulator, which simulates caller behavior to the telephone system in a test system for testing telephone services prior to the availability of the telephone services to the subscribers and clients.

Prior art related to PSTN Call simulators for testing telephone services includes the following:

U.S. Pat. No. 3,952,172 entitled "Telephone Call simulator", issued Apr. 20, 1976, discloses a telephone simulator, which includes a plurality of pseudo-subscriber circuits connected to subscriber lines. A plurality of pseudo junctures are connected to trunk lines. A number of detector circuits respond to line conditions, tones, circuit operations, data processing, and the like. A data processor uses this equipment to check incoming and outgoing calls to and from a public telephone network.

U.S. Pat. No. 4,238,649 entitled "Call Simulator", issued Dec. 9, 1980, discloses a traffic simulator for simulating calls switched through a tandem exchange by simulating both the calling and the answering exchange sides of signaling with the tandem exchange, and in which the progress of the call is split into a succession of phases during which a connection is set up through the tandem exchange, speech between subscribers is simulated, and the connection is cleared. A simulator comprises two independent modules, a calling side module connected to an incoming circuit terminating equipment of the exchange to simulate signaling between a calling exchange and the tandem exchange by its incoming circuit connected to the incoming terminating equipment and answering side module connected to an outgoing circuit terminating equipment of the exchange to simulate signaling between the tandem exchange and an answering exchange.

U.S. Pat. No. 5,065,422 entitled "Subscriber Call Simulator Capable of Testing New Services of a Telephone Switching System", issued Nov. 12, 1991, discloses a subscriber call simulator connected to a telephone switching system through subscriber lines and acting as a plurality of pseudo-subscriber telephone sets. An input/output section, inputs control procedure information for the pseudo-subscriber's telephone sets. Connected to the input/output section is a memorizing arrangement, which memorizes the control procedure information as stored information. By using the stored information, a control circuit controls the pseudo-subscriber's telephone sets. The control procedure information comprises a control procedure program and correspondence information stored in a procedure program memory in a correspondence information memory, respectively, both of which act as the memorizing arrangement for automatically testing various new telephone services.

U.S. Pat. No. 5,621,670 entitled "Communication service simulator and a communication service specification verifying method", issuedlfiled Apr. 15, 1997/Jul. 31, 1992describes a communication service simulator simulates communication service specification for a communication network having terminals and server nodes. The terminals of the communication network are registered in association with terminal data. When a called terminal has not been registered as terminal data during a simulation of a communication service specification, a terminal simulator registers the called terminal and the associated terminal data and displays the terminal data on a screen. A history regenerate/display unit displays on the screen any history of the content of a history storage unit. A simulation process controller copies a simulation process and separately executes and displays each of the processes when there is a branch, etc. in a communication service specification. During a simulation of a communication service specification, a sound output unit outputs a preselected sound from a first group of sounds when a preselected sound from a second group of sounds is received by a terminal specified by the identification information stored in a specified terminal identification information storage unit, and outputs a preselected sound from a third group of sounds, for a moment, in synchronism with the change on the screen of the terminal when the preselected sound from the second group of sounds is received by any terminal.

U.S. Pat. No. 3,952, 72 entitled "Telephone call simulator", issued/filed Apr. 20, 1976/Apr. 18, 1974 discloses a telephone simulator includes a plurality of pseudo subscriber circuits connected to subscriber lines. A plurality of pseudo junctures are connected to trunk lines. A number of detector circuits respond to line conditions, tones, circuit operations, data processing, and the like. A data processor uses these equipment to check incoming and outgoing calls to and from a public telephone network.

U.S. Pat. No. 4,021,624 entitled "Automatic call generator", issued/filed May 3, 1977/Oct. 23, 1975 discloses an automatic call generator is connectable with the main distribution frame of a common control telephone system and monitors the operation of the system. To this end, the automatic call generator is connected to dedicated line and trunk circuit ports and attempts to place calls from one dedicated spot to another. If the system fails to terminate a call within a prescribed period of time, a malfunction is noted. Two malfunctions within a prescribed set of programs for monitoring the system cause a system alarm to be generated. The call generator also tests itself after proceeding through assigned programs for monitoring the system.

None of the prior art discloses a PSTN Call Simulator which generates call load, caller actions, test data capture and output for test case validation and verification of a network service executing across PSTN and IP network interfaces.

SUMMARY OF THE INVENTION

An object of the invention is a PSTN call simulator and method of operation for use in testing PSTN to IP network telephone services.

Another object is a PSTN call simulator and method of operation simulating thousands of IP network clients doing testing of PSTN-IP telephone services.

Another object is a call simulator and method of operation providing a mix of predictable client responses during testing of PSTN-IP telephone services.

Another object is a call simulator and method of operation, which provides separate and distinct simulated client actions during testing of PSTN-IP telephone services.

These and other objects, features and advantages are achieved in a telephone call simulator which generates telephone calls for large sets of subscribers in a PST-IP telephone service for purposes of validating various telephone services, e.g. call waiting, call forwarding, etc. available to subscribers of the telephone service. The telephone numbers of subscribers are grouped in different call processing actions and/or subscriber call behavior. The telephone numbers are stored in a test input data file. Test logic scripts are generated for each group of related telephone number and stored in a file, typically the test input data file. The test input data file is read by test assignment apparatus which assigns the test logic scripts to a call processing pool. The test logic scripts are also recorded in a test output data file. Call implementation apparatus in the pool executes random calling of each test logic script for the group of related telephone numbers and records the responses to the test logic scripts in the test output data file which validates the telephone services for the related telephone numbers.

DESCRIPTION OF THE DRAWING

The invention will be further understood from the following detailed description of a preferred embodiment taken in conjunction with an appended drawing, in which.

DESCRIPTION OF PREFERRED EMBODIMENT

Within the process of developing a new telephone service for a communication system, for example, Public Switch Telephone Network (PSTN)-Internet Protocol (IP) interconnection, there is a need for a developer to simulate and verify the service and obtain client behavior definition in the system before introduction of the telephone service. The test system is spread across many components and the system is tested if the telephone service was active. The test results enable the system developers to modify the communications system to provide the service with some assurance of acceptable performance. In the present instance, the test system will be described with respect to an Internet Call Waiting (ICW) service. However, it should be understood that other services, e.g., Call Waiting, Call Forwarding, Call Back, Call Conferencing, Call ID, can be similarly tested and verified for introduction in the communications system.

Figure 1:
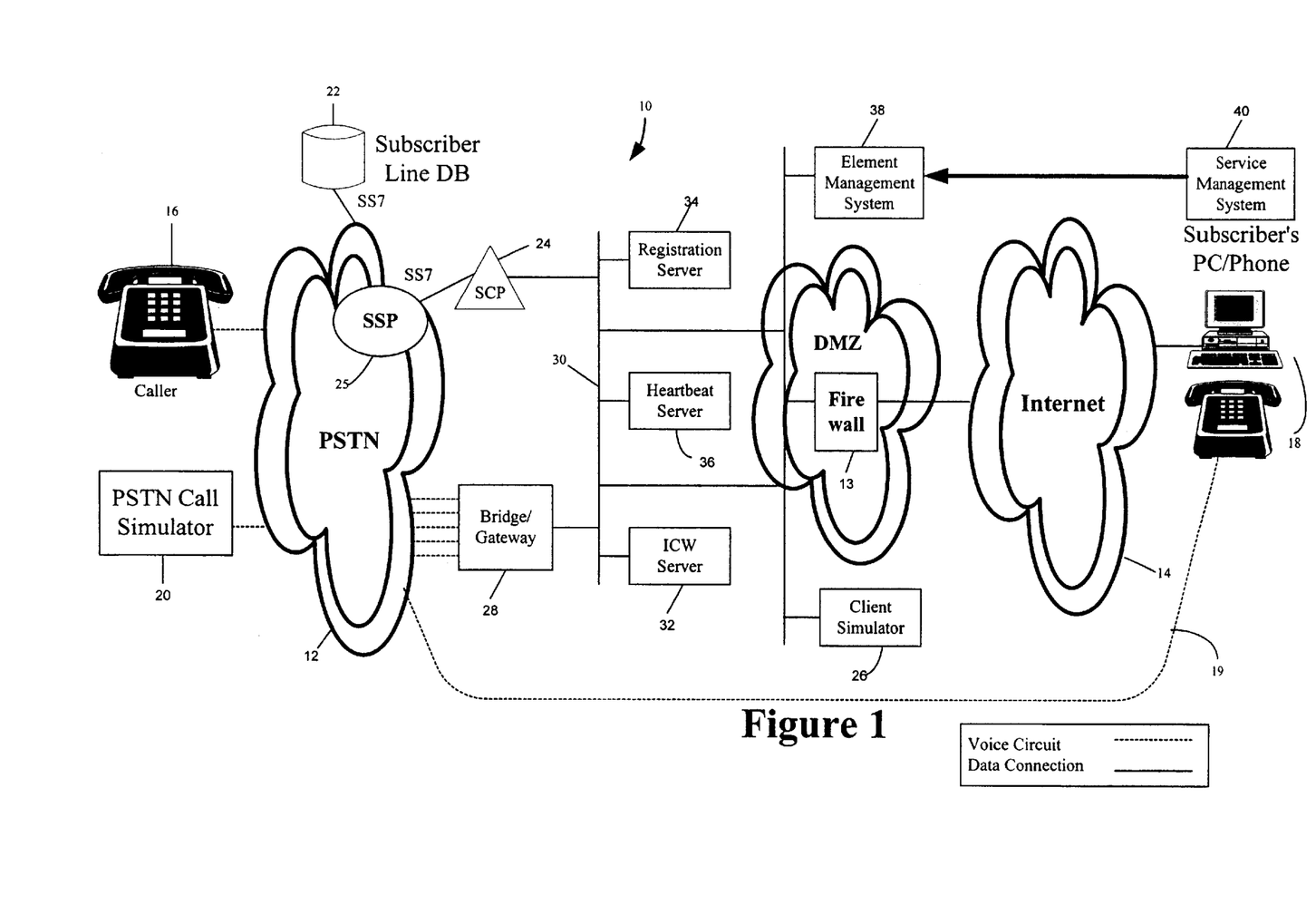
FIG. 1 is a block diagram of a PSTN-to-IP test system including PSTN Call Simulator and a Client Simulator for use in testing PSTN-to-IP network telephone services prior to the availability of the telephone service and incorporating the principles of the present invention.

In FIG. 1, a PSTN-to-IP test system 10 is shown including a telephone system 12 and a communications network 14, e.g., the Internet, adapted to simulate telephone service applications between a caller 16 coupled to the network 12 and a client 18 coupled to the internet 14. The client is also connected to the network 12 by a voice circuit 19. The network 12 is voice circuit based and supports a Signaling System 7 (SS7) including a Service Switching Point (SSP) 25 coupled to a PSTN call simulator 20; a subscriber line database 22, and a System Control Point (SCP) 24. The call simulator 20 is responsible for:

1. Generating call load to a client simulator 26;
2. Understanding call flow state models including call start-up and call termination scenarios such as:
    (i) Call forwarding;
    (ii) Call acceptance (over PSTN or IP networks);
    (iii) Generic announcements ("I'll Call Back");
3. Generate test case data output for post-test processing for accepting subscriber response load generated by the simulator 26.

The subscriber line database 22 contains telephone numbers and subscriber information for generating call details between the caller 16 and the subscriber's/PC/phone 18. A bridge/gateway 28 serves as interconnection between the network 12 and the network 14 as will be further described hereinafter.

A TCP/IP bus 30 couples the SCP 24, the bridge/gate 28, and the simulator 26 thorough a firewall 13 to the Internet 14. The bus 30 provides a data connection between the networks 12 and 14. An application server 32 is coupled to the bus 30 and provides different types of telephone services for calls placed between the caller 16 and the subscriber 18. As indicated before, the application server 32 may be used for other service testing, e.g., Call Waiting, Call Forwarding, Call Back, Call Conferencing, Caller ID, etc. For purposes of the present description, however, the server 32 will be referred to as an Internet Call Waiting (ICW) server. The ICW server is where multiple instances of an Internet Call Waiting (ICW) application are executed for incoming call to subscriber(s). The ICW application is responsible for taking details of the incoming call and translating the call into the correct format for the client's simulator 26 software process. The ICW application is also responsible for the detection of time out conditions that may exist when the subscriber has not responded to an incoming call. Once the subscriber has responded, the ICW application then translates the response back into a format that the Service Control Point (SCP) 24 can process.

The client simulator 26 accepts the call load generated by the simulator 20 and provides a load to the simulator 26. The simulator 26 is also programmed to a service state model, which relates to subscriber options and actions. The simulator 26 is part of the PSTN-IP service test system that provides the ability to simulate thousands of clients doing testing. The behavior of the simulated clients is based on predetermined telephone ranges. For example, all telephone numbers in the range of 954-555-0000 through 954-555-1000 will always be "active" and always "Accept the Call". By using the predetermined behavior, the test results are easy to verify. Verification during integration tests of single calls and during system load tests with many thousands of calls is predictable. Any deviation from this predetermined behavior is flagged by the PSTN simulator and the client simulator 26 into a test data output log file. Further details on the behavior of clients are described in Ser. No. 09/468,929, supra.

A registration server 34 coupled to the bus 30 records the ICW client receiving the service. The role of the server 34 is to maintain the current state of the subscriber's usage of the service. More specifically, the server 34 provides a Telco Service Provider (not shown) for the PSTN 12 with the ability to offer subscriber's PSTN-IP telephone services, which are based on the state of the subscriber's usage of the service. While a customer subscribes to a service, such as ICW, the customer's usage of that service is transient in nature. When the subscriber logs into the Internet, the ICW client software registers with the server 34 based on options set by the subscriber at installation time. These options allow manual or automatic registration at start up of the subscriber's PC. As calls arrive at the Service Switching Point (SSP) 24 and the PSTN, the SSP sends a Termination Attempt Trigger (TAT) to the Service Control Points (SCP) 24. The SCP 24 then sends a Query Request (QReq) message to the server 34. The server 34 returns a current state of the subscriber as "active" or "inactive" for the ICW service.

The server 36 is made aware of the subscriber's registration by the server 34. From that point on, the server 36 awaits the transmission of the heart beat message from the subscriber's client software. As heart beats arrive from the subscriber's client software, the server 36 keeps track of the status of the subscriber through the heart beat interval and the number of "missed" heart beats. This method is used in case the subscriber's PC has been shut down, powered off, or has experienced a power outage before the client's software has had a chance to send a de-registration message to the registration server 34. The heart beat interval and the number of permissible "missed" heart beats are configured by the Telco service provider at the installation time and may be changed during ongoing operation of the service.

An Element Management System (EMS) 38 is coupled to the bus 30 and provides subscriber data to the registration server 34. The EMS serves the Telco Service Provider's Operation, Administration, Maintenance & Provision (OAM&P) requirements. For OAM&P, the EMS provides graphical status indications of the various PSTN-IP components, such as the registration server, heart beat server, and application server. In addition to status, the EMS provides an alarm application, which is used by Operation & Maintenance personnel for the PSTN-IP system within the production environment.

A Service Management System (SMS) 40 is linked to the EMS 38. The SMS is used by the Telco Service Provider Customer Service Personnel (not shown) as a repository and transaction system for customer service subscriptions. Once a customer has subscribed to a particular application service, such as ICW, the SMS is responsible for the provisioning of the service subscription for the various PSTN and IP network platforms within the Telco Service Provider's domain. In the case of ICW service, the SMS 40 provisions the SSP 25 switches, the SCP 24 and the registration server 34. The interface to the Registration Server is via the EMS. The EMS is then responsible for provisioning appropriate registration servers. By using this method, the EMS provides a single interface to the SMS for multiple registration servers, which decreases the complexity of the SMS communication interface and routing tables.

Further details on setting up and operating the test system 10 can be found in the related applications, Ser. No. 09/468,929 and Ser. No. 09/587,322 referred to above.

Figure 2:
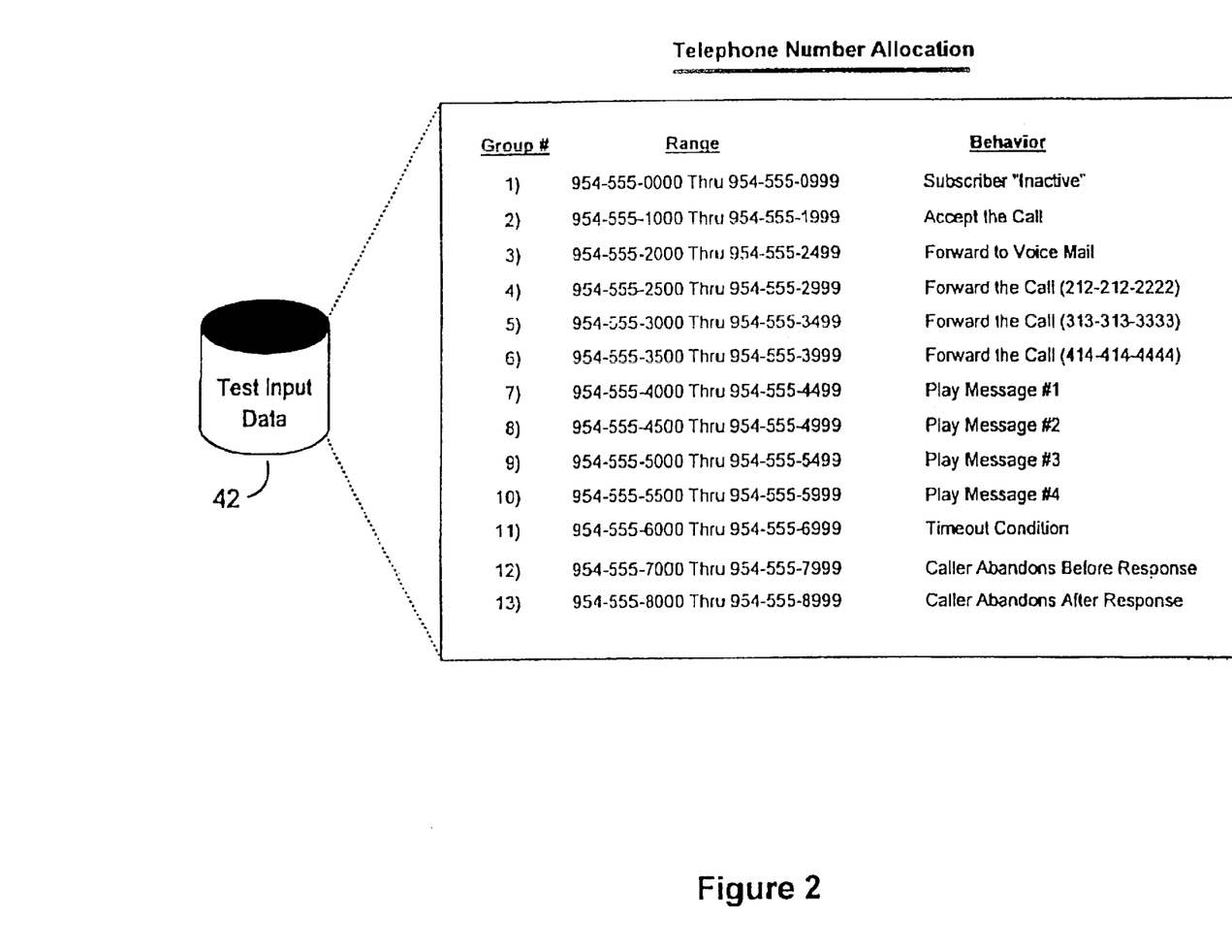
FIG. 2 is a representation of a telephone numbering scheme for verifying network services under test, e.g. Internet Call Waiting in the test system of FIG. 1.

Turning to FIG. 2, in order to make post-test results easier to identify, groups of Telephone Numbers, TNs are stored by group number in a test input database 42 and identified in ranges with each range having a specific behavior. Thus, each range group will have the same test result. For example, in Group 1, TNs in the range from 954-555-0000 through 954-555-0999 will always have a result of "Subscriber-Inactive". Therefore, all test results in this TN range will have the same test data output as it relates to call testing. In Group 2, the TNs 954-555-1000 through 954-555-1999 will have a test result of "Accept Call". The other range groups have other test results as indicated.

Figure 3:
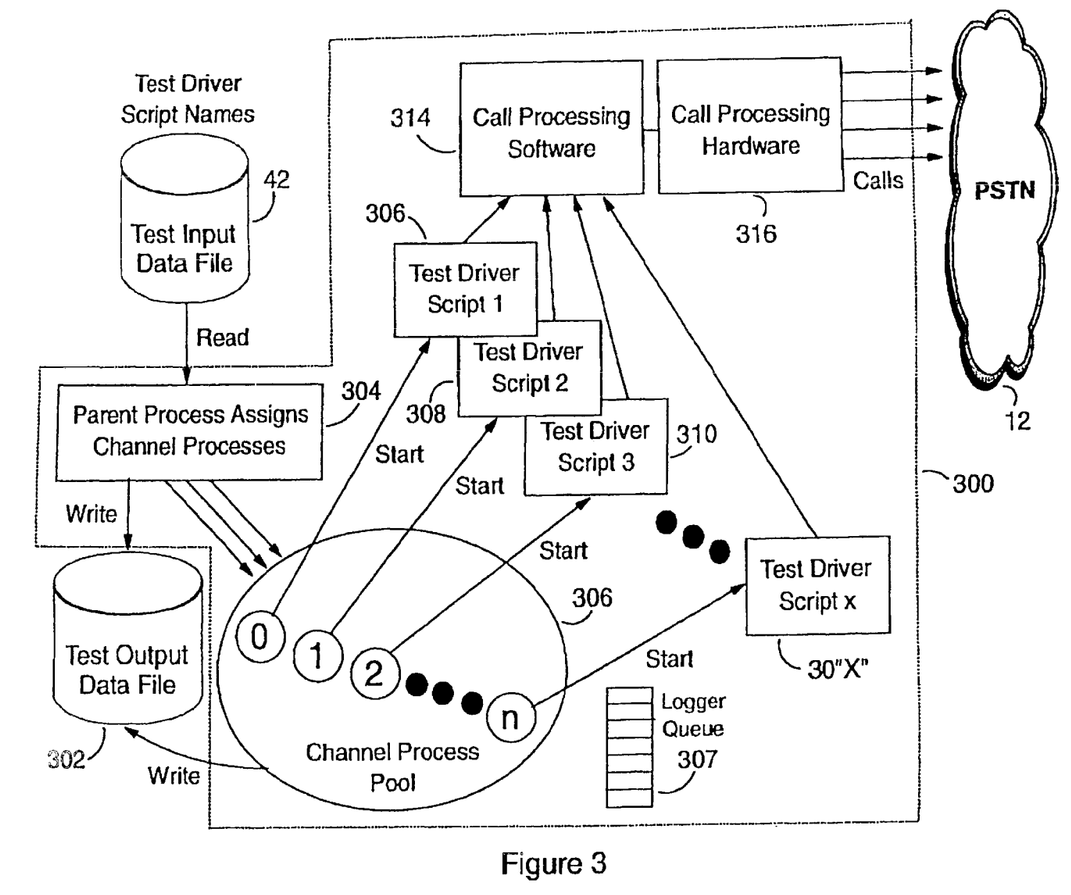
FIG. 3 is a block diagram of the PSTN Call Simulator of FIG. 1 for generating test calls to PSTN-IP subscribers using various test driver scripts.

FIG. 3 shows the details of a PSTN Call Simulator 300 (represented in FIG. 1 as PSTN Call Simulator 20). The Simulator 300 is coupled to a test input data file 42 for reading the telephone numbers shown in FIG. 2 and test driver script. The scripts implement calls to the telephone through the PSTN 12 (See FIG. 1) and verify the call behavior of the called telephone number. The results of the calls are written to a Test Output Data File 302. Included in the Call Simulator 300 is Test Assignment Apparatus 304 which assigns the test driver scripts and related telephone numbers to a Call Processing Pool 306 which logs the calls to the pool in a logger queue 307. The pool 306 contains standard call implementation apparatus 0, 1, 2 . . . N for randomly calling telephone numbers in the different group and implementing the appropriate test driver scipt. The test driver scripts track the behaviors of the subscribers in the ranges shown in FIG. 2. Thus, test driver script number 1 will be for subscribers to "Accept Calls". Test driver script 308 may be for a subscriber to "Forward the Call". Test driver script 310 may be for a "Caller to Abandon the Call before Response". Similarly, test driver script 30X may be for any one of the other call behavior groups shown in FIG. 2. The output of each test driver script for the assigned telephone numbering range is received by call processing software 314 which sets up the call simulator for generating the telephone calls. The call processing software controls conventional call processing hardware 316 which executes the test driver script.

Figure 4:
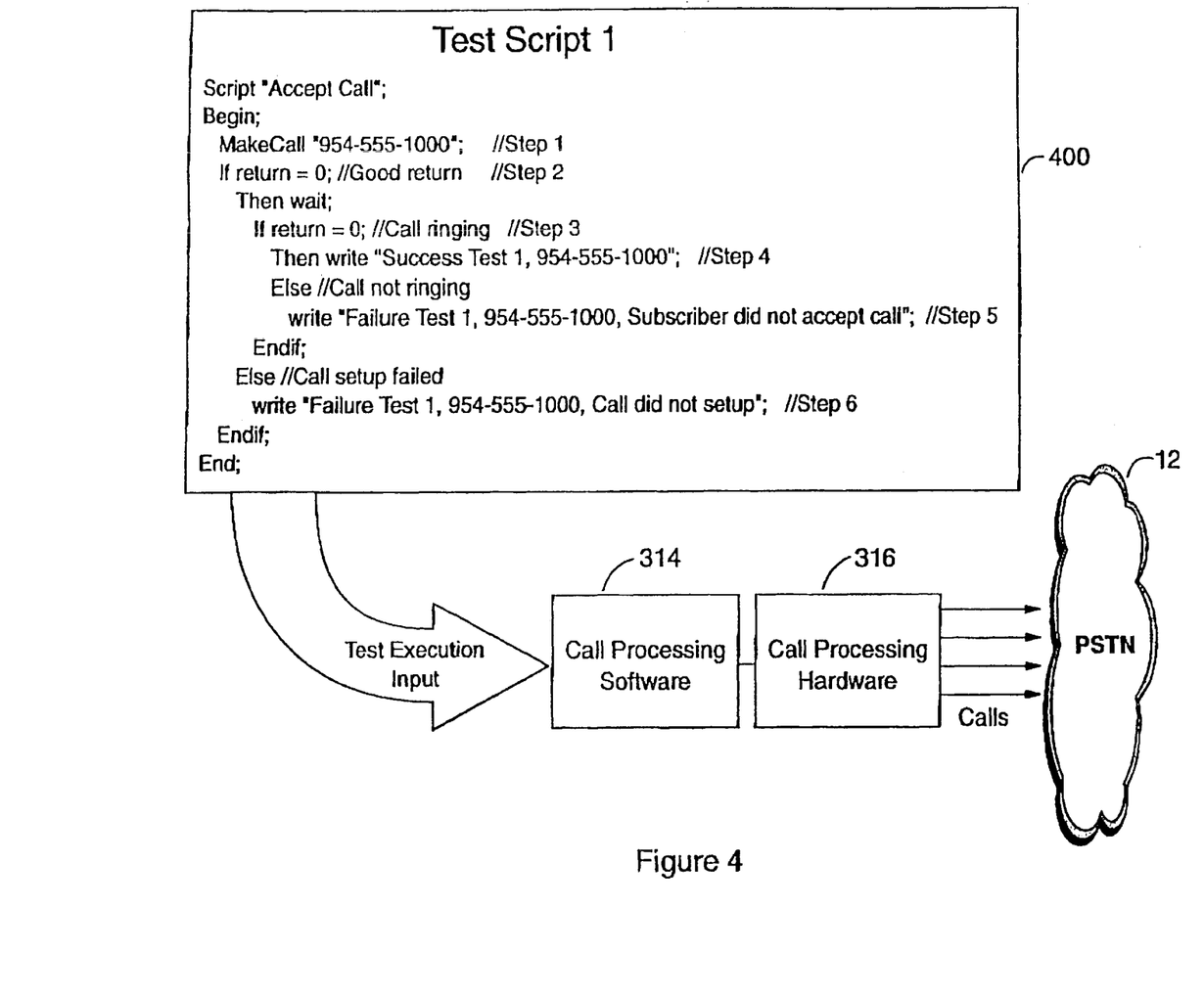
FIG. 4 is a block diagram of an exemplary test driver script using call processing software; call processing hardware and the numbering scheme of FIG. 2 for generating calls to PSTN-IP subscribers in the test system of FIG. 1.

In FIG. 4, a typical test logic script 400 e.g. "Accept Call" is shown for a subscriber telephone number in Group 2 (See FIG. 2). The test logic script 400 stored in the test input data file 42 (see FIG. 3) is read by the test assignment apparatus 304 and assigned to a call implementation apparatus in the pool 306. The call is logged in the logger queue 313. The call implementation apparatus is standard telephone placement apparatus described, for example, in FIG. 3, Call Processing software 314 and Call processing Hardware 36, initiates a call 954-555-1000 in Step 1. The call implementation apparatus listens for a return signal from 954-555-1000 indicating whether or not the called number accepted the call. If the called number returns a zero (0), a good return is indicated in Step 2. The apparatus waits to receive a signal indicating "Call Ringing" at the called number in Step 3. If a zero (0) is returned by the called number, the call went through and the implementation apparatus writes the results of the test to the test output data file 302 for 954-555-1000 in Step 4. If the called number does not return a zero for "Call Ringing", the implementation apparatus in Step 5 records a "Call Not Ringing" and writes the results to the test output data as "Failure Test" 954-555-1000 indicating the subscriber "Did Not Accept The Call" in Step 5. Alternatively, test logic script 1 may indicate the "Call Set Up Failed" when the called number does not return a zero, in which case the implementation apparatus writes "Failure Test 1" 954-555-1000 "Call Did Not Set Up" in Step 6, after which the test logic script ends. The test logic script 400 is executed by the call processing software 314 and call processing hardware 316, which will be described in FIGS. 5 and 6, respectively, in conjunction with FIG. 3.

Figure 5:
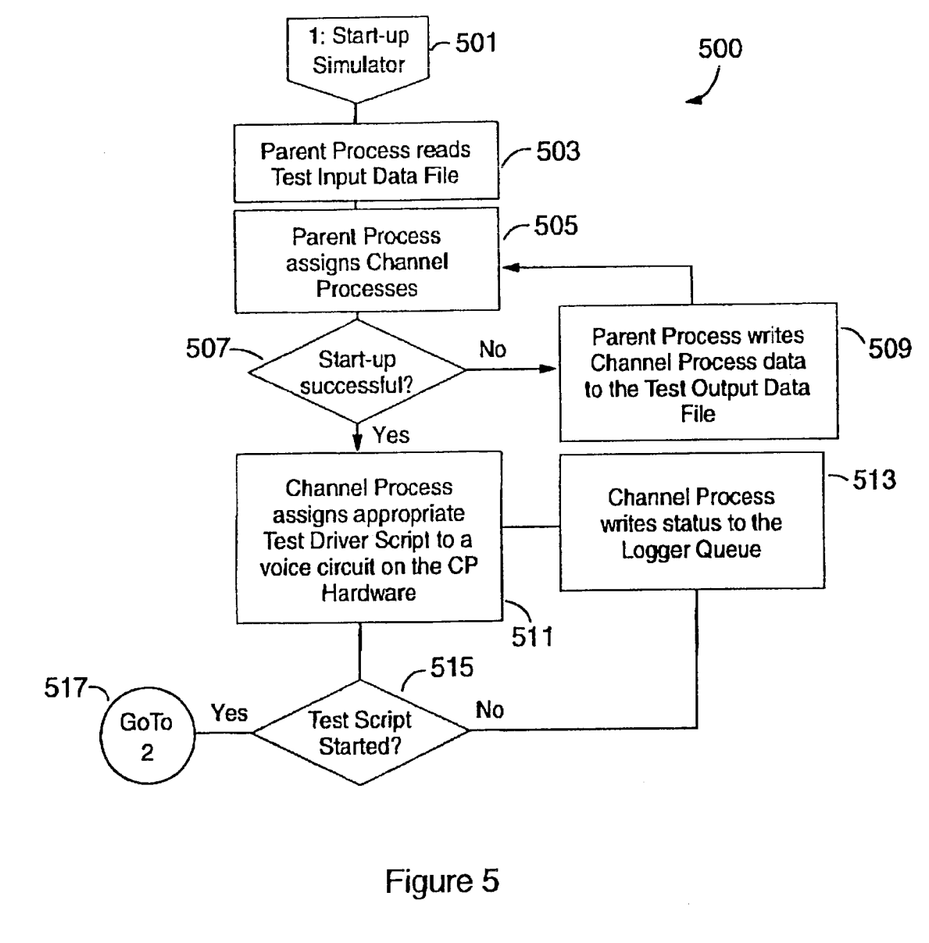
FIG. 5 is a flow diagram of the call processing software of FIG. 3.

In FIG. 5, process 500 initiates the start-up of the simulator in Step 501. The test assignment apparatus 304 reads the test input data file 42 in Step 503. The test assignment apparatus signs each Call Implementation Apparatus in the pool 306 to a test logic script and related call numbering group in Step 505. A test is performed in Step 507 to determine if start-up of the call implementation has been successful. A "no" condition initiates Step 509 in which the test assignment apparatus writes the call implementation data to the test output data file 302. A "yes" condition initiates Step 511 in which the assigned test driver script is outputted on a voice circuit of the call processing hardware. In Step 513 the call implementation apparatus writes the status of the call to the logger queue 313. A test 515 is initiated to determine if the test logic script has been started. A "no" condition returns the process to Step 513 to update the logger queue. A "yes" condition initiates the call processing hardware in Step 517 which begins in FIG. 6.

Figure 6:
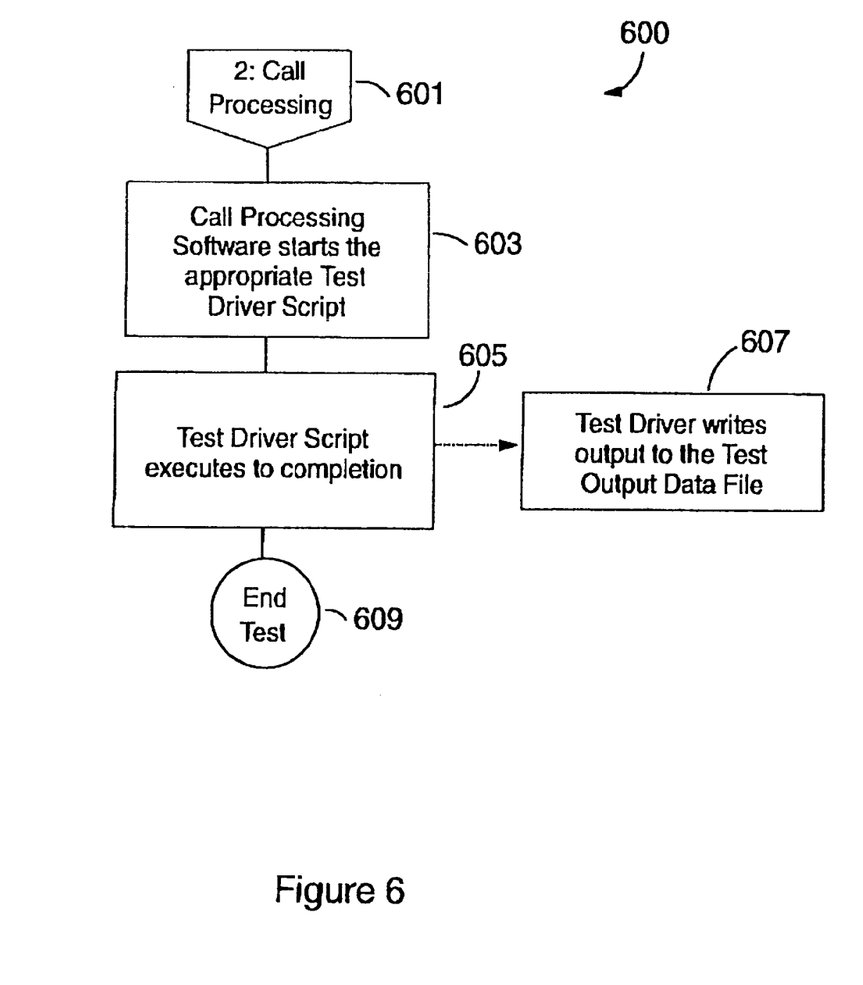
FIG. 6 is a flow diagram for the call processing hardware of FIG. 3.

In FIG. 6, a calling process 600 is initiated in Step 601. The process initiates a call to a telephone number applicable to the script in a Step 603. The test logic script executes to completion in Step 605 as described in the test logic script 400 shown in FIG. 4. It should be noted that different test driver scripts are executed for different call numbering groups and, in each case, the call implementation apparatus after placing the call, listens for the return of a signal condition, typically a zero. When the signaling condition is received, the test logic script proceeds to the next Step until completed and is recorded in the test output data file. Those telephone numbers not returning a signaling condition are recorded in the test output data file as a "failed state". After writing the test output to the test output data file in Step 607, the call processing ends in Step 609.

While the invention has been shown and described in a preferred embodiment, various changes can be made without departing from the spirit and scope of the invention as defined in the appended claims, in which:

We claim:

1. A telephone call simulator for PSTN-IP telephone services, comprising:
   (a) a test input file containing IP subscriber numbers identified in ranges with each range representing a call behavior group of internet clients;
   (b) test logic scripts which describe calling process actions and/or internet client call behavior in each call behavior group for the respective applications;
   (b1) an application server responsive to the test scripts for providing applications for different types of telephone services for the internet clients.
   (c) test assignment apparatus which assigns the test logic scripts to a call processing pool;
   (d) call implementation apparatus within the call processing pool, the apparatus implementing the test logic script in executing a call to a group of telephone numbers of the internet clients in different behavior groups related to the test logic script for testing telephone services prior to the availability of the services to the internet clients; and
   (e) a test output data file which records the test logic scripts and corresponding responses received by each call implementation apparatus for the test logic script in each group of related telephone numbers of the internet clients for comparison and validation of the test logic script for each group.

2. The telephone call simulator of claim 1 further comprising:
   (f) test database storing apparatus which stores the telephone number in groups, each group related to a different calling process actions and/or subscriber call behavior responsive to a telephone call initiated by the simulator.

3. The telephone call simulator of claim 1 further comprising:
   (g) test logic script software instructions which initiates scripted calls to telephone numbers, receive return signals from the called number and indicate success or failure of service applications for clients in different behavior groups.

4. The telephone call simulator of claim 1 further comprising:
   (h) recording apparatus which records the assignment of test logic scripts and called telephone numbers by the test assignment apparatus.

5. The telephone call simulator of claim 1 further comprising:
   (i) communication apparatus linking the channel processing pool to a PSTN.

6. The telephone call simulator of claim 1 further comprising:
   (j) reporting apparatus which reports the results of the test logic scripts to the test output data file.

7. The telephone call simulator of claim 1 further comprising:
   (k) test writing apparatus which writes test logic script and telephone number assignment to the test output data file.

8. The telephone call simulator of claim 1 further comprising:
   (l) receiver apparatus which receives signals transmitted by called telephone in response to a test logic script.

9. The telephone call simulator of claim 1 further comprising:
   (m) test determining apparatus which determines whether the service test was successful or failed.

10. The telephone call simulator of claim 1 further comprising:
    (n) test comparison apparatus which compares the test logic script assignment and the test logic script results for validation of the telephone service.

11. A method of generating telephone calls for testing call processing actions and/or subscriber call behavior in a PSTN-IP telephone service, comprising the steps of:
    (a) generating and storing in a test input data file subscriber telephone numbers identified in ranges with each range representing a call behavior group of internet clients;

(b) generating and storing in the test input data file test logic scripts for testing the calling process actions and subscriber call behavior in each group of related telephone numbers for the respective applications;

(b1) providing applications for different types of telephone services in response to the test scripts for the internet clients;

(c) retrieving the telephone numbers by groups and the corresponding related test logic script;

(d) assigning the related telephone numbers by group and corresponding test logic script to a call processing apparatus;

(e) implementing telephone calls by the call processing apparatus to the related group of telephone numbers according to the corresponding test logic script for testing telephone services prior to the availability of the services to the internet clients; and (f) recording and storing calling results of the test logic script for each group of related telephone numbers of the internet clients for comparison with the test logic script in validating the PSTN-IP telephone service.

12. The method of claim 11 further comprising the step of:

(f) storing the telephone number in groups, each group related to a different calling process actions and/or subscriber call behavior responsive to a telephone call initiated by the simulator.

13. The method of claim 11 further comprising the step of:

(g) initiating scripted call to telephone numbers, receiving return signals from the called number and indicating call success or call failure.

14. The method of claim 11 further comprising the step of:

(h) recording apparatus which records the assignment of test logic scripts and called telephone numbers by the test assignment apparatus.

15. The method of claim 11 further comprising the step of:

(i) linking the channel processing pool to a PSTN.

16. The method of claim 11 further comprising the step of:

i) reporting the results of the test logic scripts to the test output data file.

17. The method of claim 11 further comprising the step of:

(k) writing test logic script and telephone number assignment to the test output data file.

18. The method of claim 11 further comprising the step of:

(l) receiving signals transmitted by called telephone in response to a test logic script.

19. The method of claim 11 further comprising the step of:

(m) determining whether the test was successful or failed.

20. The method of claim 11 further comprising the step of.

21. A program medium, executable in a computer system, for generating telephone calls for testing call processing actions and/or subscriber call behavior in a PSTN-IP telephone service, the medium comprising:

(a) program instructions for generating and storing in a test input data file subscriber telephone numbers identified in ranges with each range representing a call behavior group of internet clients;

(a1) program instructions providing different types of telephone services for the internet clients;

(b) program instructions for generating and storing in the test input data file test logic scripts for testing the calling process actions and subscriber call behavior in each group of related telephone numbers for the respective applications;

(c) program instructions for retrieving the telephone numbers by groups and the corresponding related test logic script;

(d) program instructions for assigning the related telephone numbers by group and corresponding test logic script to a call processing apparatus;

(e) program instructions for implementing telephone calls by the call processing apparatus to the related group of telephone numbers of the internet clients according to the corresponding test logic script for testing telephone services prior to the availability of the services to the internet clients; and (f) program instructions for recording and storing calling results of the test logic script for each group of related telephone numbers of the internet clients for comparison with the test logic script in validating the PSTN-IP telephone service.

22. The program medium of claim 21 further comprising:

(f) program instructions for storing the telephone number in groups, each group related to a different calling process actions and/or subscriber call behavior responsive to a telephone call initiated by the simulator.

23. The program medium of claim 21 further comprising:

(g) program instructions for initiating scripted call to telephone numbers, receiving return signals from the called number and indicating call success or call failure.

24. The program medium of claim 21 further comprising:

(h) program instructions for recording apparat us which records the assignment of test logic scripts and called telephone numbers by the test assignment apparatus.

25. The program medium of claim 21 further comprising:

(i) program instructions for linking the channel processing pool to a PSTN.

26. The program medium of claim 21 further comprising:

(j) program instructions for reporting the results of the test logic scripts to the test output data file.

27. The program medium of claim 21 further comprising:

(k) program instructions for writing test logic script and telephone number assignment to the test output data file.

28. The program medium of claim 21 further comprising:

(l) program instructions for receiving signals transmitted by called telephone in response to a test logic script.

29. The program medium of claim 21 further comprising:

(m) program instructions for determining whether the test was successful or failed.

30. The program medium of claim 21 further comprising:

(n) program instructions for comparing the test logic script assignment and the test logic script results for validation of the telephone service.

* * * * *